United States Patent [19]

Etter et al.

[11] 4,059,792

[45] Nov. 22, 1977

[54] METHOD FOR PRODUCING RECTIFIER WITH SWITCHES OF ASYMMETRIC VOLTAGE BREAKDOWN STRENGTHS

[75] Inventors: Peter Etter, Oberehrendingen; Werner Faust, Wettingen, both of Switzerland

[73] Assignee: BBC Brown Boveri & Company Limited, Baden, Switzerland

[21] Appl. No.: 619,941

[22] Filed: Sept. 30, 1975

[30] Foreign Application Priority Data

Oct. 29, 1974 Switzerland .................. 14457/74

[51] Int. Cl.² ............... H02M 7/757; H03K 3/35
[52] U.S. Cl. ............... 363/135; 307/252 P; 307/252 Q; 363/54
[58] Field of Search ............... 321/11, 27 R, 47; 307/252 L, 252 Q, 252 P

[56] References Cited

U.S. PATENT DOCUMENTS

| 3,579,082 | 5/1971 | Bossi | 321/11 |
|---|---|---|---|
| 3,599,075 | 8/1971 | Etter | 321/11 |
| 3,943,427 | 3/1976 | Tolstov et al. | 321/11 |

Primary Examiner—William H. Beha, Jr.
Attorney, Agent, or Firm—Oblon, Fisher, Spivak, McClelland & Maier

[57] ABSTRACT

A rectifier for a medium voltage rectifier system as well as for high voltage-direct current transmission includes a plurality of thyristor switches. The switches have asymmetric voltage breakdown strengths, the asymmetry being at least 10% for the forward blocking direction compared with the reverse blocking direction. The thyristor switches are dimensioned voltage-wise to safely block even long lasting overvoltages in both the forward and reverse blocking directions occurring during operation and to withstand momentary surge and switching voltages limited by an overvoltage suppressor in the reverse blocking direction.

7 Claims, 7 Drawing Figures

METHOD FOR PRODUCING RECTIFIER WITH SWITCHES OF ASYMMETRIC VOLTAGE BREAKDOWN STRENGTHS

BACKGROUND OF THE INVENTION

1. Field of the Invention

The invention concerns power line driven rectifiers, especially for medium-voltage rectifier equipment as well as for high-voltage-direct current transmission (HVDC).

2. Description of the Prior Art

In thyristor switches with a specified voltage breakdown strength, it has been difficult to achieve as exact voltage symmetry as possible with respect to the voltage breakdown strengths in the forward and reverse directions. Certain asymmetries were purely accidental and lay within the tolerence limits. This utilization of switches with symmetric voltage breakdown strengths at first seems cogent and obvious, but it actually entails a great increase in the cost of thyristors and their circuitry.

SUMMARY OF THE INVENTION

An aim of the invention is to reduce the cost of rectifiers with thyristor switches. This is achieved by discarding the thought of voltage symmetry in the switches and by using switches with voltage breakdown strengths in the forward and reverse blocking directions exhibiting a large asymmetry lying outside the normal tolerance limits.

The rectifier of the invention has asymmetric voltage breakdown strengths in the thyristor switches, amounting to at least 10% in comparing the forward and reverse blocking directions, and further has a dimensioning of the thyristor switches with respect to voltage that they safely block even rather long-lasting overvoltages in the forward direction that occur in operation. In the reverse blocking direction, the switches withstand brief surge and switching overvoltages, i.e. they have voltage breakdown strengths up to the voltage limit of the esternal voltage protection.

The foregoing and other objects are attained in accordance with one aspect of the present invention, through the provision of a rectifier for a medium voltage rectifier system as wll as for high voltage-direct current transmission comprising a plurality of thyristor switches, the switches having asymmetric voltage breakdown strenghts, the asymmetry being at least 10% for the forward blocking direction compared with the reverse blocking direction, the thyristor switches being dimensioned voltagewise to safely block even long-lasting overvoltages in both the forward and reverse blocking directions occurring during operation and to withstand momentary surge and switching voltages limited by an overvoltage supressor in the reverse blocking direction.

BRIEF DESCRIPTION OF THE DRAWINGS

Various objects, featuresand attendant advantages of the present invention will be more fully appreciated as the same becomes better understood from the following detailed description of the present invention when considered in connection with the accompanying drawings, in which.

DETAILED DESCRIPTION OF THE PREFERRED EMBODIMENTS

Figure 1:
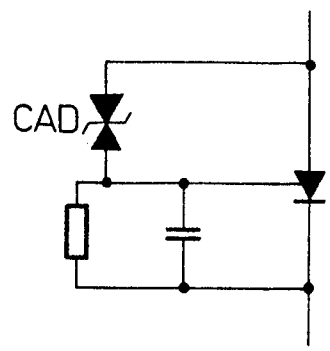
FIG. 1 illustrates a special triggering circuit for firing.

Referring now to the drawings, wherein like reference numerals designate identical or corresponding parts throughout the several views, it is important to the invention that the thyristor switches protect themselves against overvoltages in the forward direction by firing, while in the reverse blocking direction, as a rule, an external overvoltage protection must be provided. Firing can be accomplished e.g. with a special triggering circuit, as shown in FIG. 1. As can be seen, a CAD-diode ("Controlled Avalanche Diode" "Diode with uniform avalanche breakdown") is connected between anode and firing electrode of the thyristor. Between the firing electrode and cathode there is connected a parallel RC-network. Such a triggering arrangement is shwon e.g. in Swiss Pat. No. 492,334.

Figure 2:
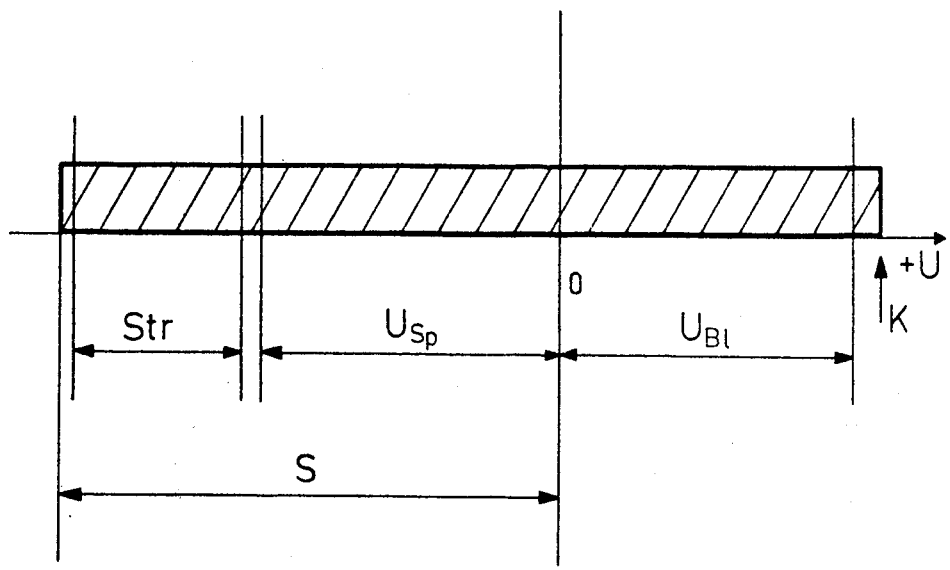
FIG. 2 is a line diagram of an asymmetric voltage breakdown switch with overvoltage suppressor in the reverse blocking direction.

FIG. 2 shows a line diagram of an asymmetric voltage breakdown switch with overvoltage suppressor in the reverse blocking direction; on the horizontal axis is indicated the switch voltage, K is the firing voltage of the switch, S the protection level, Str the spread of the overvoltage suppressor, $U_{SP}$ the maximum periodic voltage overswing in the reverse blocking direction and $U_{Bl}$ the maximum periodic voltage overswing in the forward blocking direction. The switches are dimensioned voltagewise so that they (see FIG. 2) safely block rather long-lasting peak voltages occurring during operation in both the forward and the reverse directions. While the switches are dimensioned, with respect to surge voltage loading in the reverse blocking direction, to the protection level of the overvoltage suppressor and must therefor be dimensioned higher voltagewise by the voltage tolerance of the overvoltage suppressor, the occasional firing of a rectifier by momentary overvoltages in the positive direction is permitted since such firings hardly disturb the operating behavior of the rectifier system and are therefore in general not objectionable. Even in DC/AC converter operation, an occasional firing of a switch by momentary overvoltages can be permitted if an overcurrent is prevented by suitable means.

These are various possibilities for making switches with asymmetric voltage breakdown strengths:

a. The series-connected thyristors are in voltage-asymmetric form so that e.g. the forward blocking voltage is 20% lower than the breakdown voltage in the reverse blocking direction. Of course, there is no saving thyristors in this instance, but it is clear that the production of asymmetric thyristors requires much less care and effort and is therefore cheaper than the production of substantially symmetric thyristors with narrow tolerances.

b. The thyristor chain consisting of voltage-symmetric thyristors (within customary tolerance) is dimensioned for the nescessary voltage breakdown strength of the switch in the forward blocking direction. In series with this chain, there is connected a diode chain calculated to give the switch the necessary voltage breakdown strength in the reverse blocking direction.

Figure 3:
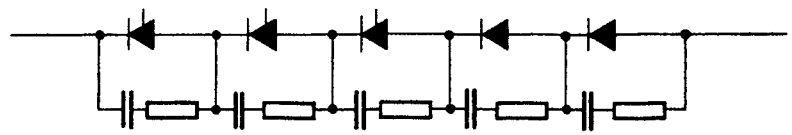
FIG. 3 illustrates a series circuit with 3 thyristors and 2 diodes with each semiconductor element having a parallel-connected RC-circuit.
Figure 3A:
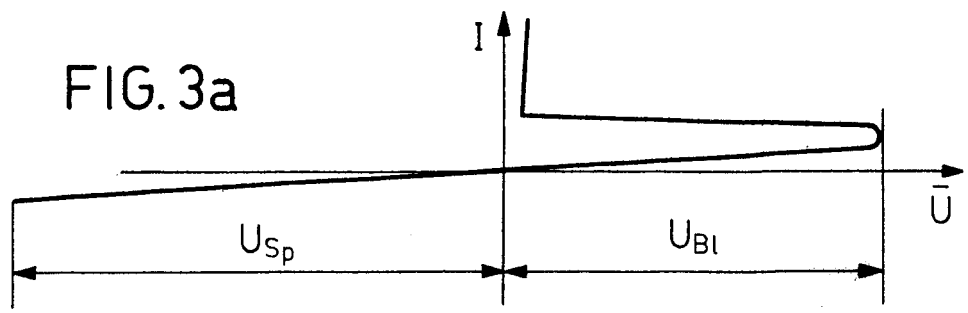
FIG. 3a illustrates the current-voltage characteristic with $U_{Sp}$ denoting the reverse blocking voltage and with $U_{Bl}$ denoting the forward blocking voltage of the switch.
Figure 4:
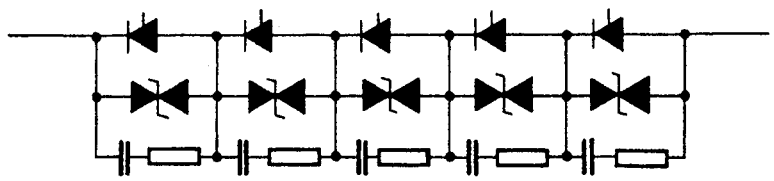
FIG. 4 illustrates the series-connected thyristors of a switch connected with voltage-asymmertic CAD-elements so that the thyristors of a set are loaded in the forward blocking direction up to the rated voltage and in the reverse blocking direction almost up to their breakdown voltage.
Figure 4A:
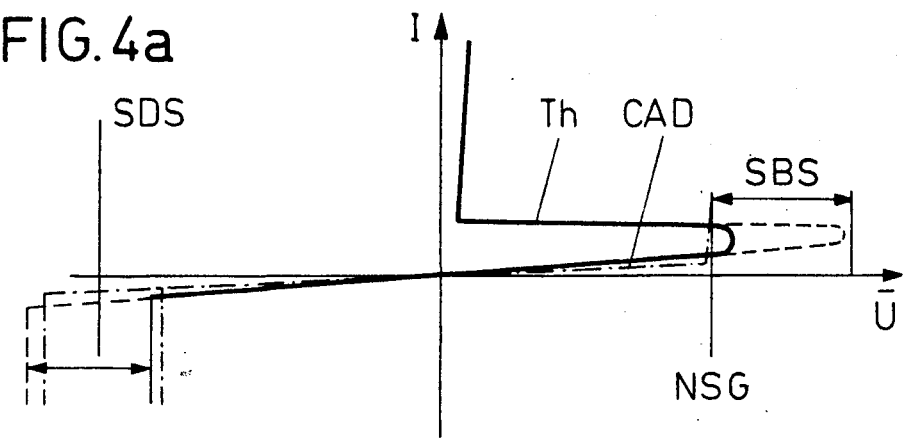
FIG. 4a shows the current-voltage characteristic wherein the solid curve Th refers to the thyristor, the dashed curve CAD to the CAD-element, SDS is the spread of the negative breakdown voltages, SBS that of the forward blocking voltages and NSG is the rated voltage of a set under consideration.

FIG. 3 shows a series circuit with 3 thyristors and 2 diodes with each semiconductor element having a parallel-connected RC-circuit. FIG. 3a illustrates the current-voltage characteristic; $U_{SP}$ denotes the reverse blocking voltage $U_{BI}$ denotes the forward blocking voltage of the switch. In this configuration, some of the thyristors are replaced by much cheaper semiconductor diodes and the cost of control circuitry is proportionately reduced resulting in a sensible lowering of cost even in the case where an overvoltage suppressor is used in the blocking direction also.

c. A saving of costly thyristors is also achieved by the variant of FIG. 4 where the series-connected thyristors of a switch (along with the normal RC-circuitry) are connected with voltage-asymmetric CAD-elements (semiconductor diodes with uniform avalanche breakdown) so that the thyristors of a set are loaded in the forward blocking direction up to the rated voltage (= permissible periodic peak voltage), but in the reverse blocking direction, almost up to their breakdown voltage (permissible non-periodic peak voltage). FIG. 4a shows the current-voltage characterisitc; the solid curve Th refers to the thyristor and the dashed curve CAD to the CAD-element. SDS is the spread of the negative breakdown voltages, SBS that of the forward blocking voltages and NSG is the rated voltage of a set under consideration.

Figure 5:
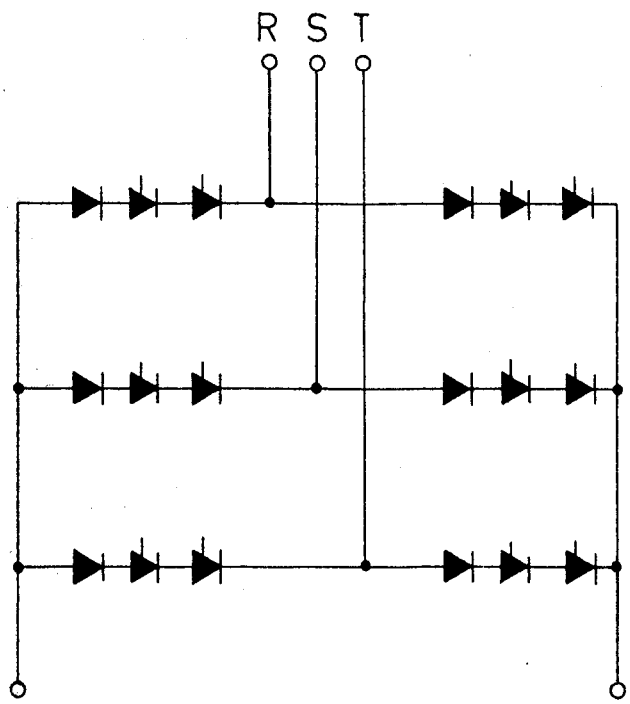
FIG. 5 shows a rectifier connected as an AC bridge with voltageasymmetric switches.

FIG. 5 shows a rectifier connected as an AC bridge with voltage asymmetric switches. The asymmetry is achieved by making some of the semiconductor elements in each arm of the bridge uncontrolled diodes.

In place of thyristors and diodes, other semiconductor components can also be used, e.g. Triacs, thyristors blocking only in the forward direction with diodes, etc.

In general a voltage-asymmetric switch using diodes is significantly more economical than a voltage-symmetric switch of the same voltage breakdown strength, since a large proportion of the thyristors with their concomitant circuitry can be eliminated and in their place can be used much cheaper diodes or CAD-diodes with their simpler circuitry. An important advantage is that in this instance no control circuitry is necessary.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the U.S. is:

1. A method for producing rectifiers for medium and high voltage systems at reduced cost comprising the steps of:
    providing a rectifier element including a plurality of series connected thyristor switches,
    constructing said rectifier element so as to have an asymmetric breakdown voltage characteristic in which the breakdown strength is at least 10% greater in the reverse direction than in the forward direction; and,
    dimensioning said rectifier element voltagewise to safely block even long lasting overvoltages in both the forward and reverse blocking directions occurring during operation and to withstand momentary surge and switching voltages limited by an overvoltage suppressor in the reverse blocking direction.

2. A method as in claim 1 wherein said step of constructing includes the step of:
    forming said rectifier element of a series of interconnected thyristor switches each having voltage-asymmetric construction so that the forward blocking voltage is at least 10% lower than the breakdown voltage in the reverse direction.

3. A method as in claim 1, wherein said step of constructing includes the step of:
    forming said rectifier element of series-connected thyristors and a diode chain connected in series with the thyristors wherein the combined diode-thyristor chain is dimensioned voltagewise to provide the required voltage breakdown strength in the reverse blocking direction.

4. A method as in claim 1, wherein said step of constructing includes the step of:
    forming said rectifier element of series-connected thyristors, the thyristors being connected in parallel with voltage-asymmetric back-to-back diode elements with uniform avalanche breakdown which are so dimensioned voltagewise that the thyristors of a set are loaded up to the rated voltage in the forward direction and almost to their breakdown voltage in the reverse blocking direction and the spread of the breakdown voltages of the thyristor set is fully utilized.

5. A method as in claim 1, wherein said step of constructing includes the step of:
    forming said rectifier element of series-connected thyristors, the thyristors exhibiting a uniform avalanche breakdown behavior in the reverse blocking direction, each thyristor being connected back-to-back with a diode which has a higher voltage breakdown strength in the reverse blocking direction than the thyristor, each diode exhibiting in the forward blocking direction of the thyristor a uniform avalanche breakdown behavior and a lower breakdown voltage than the thyristor.

6. A method as in claim 1, further comprising the steps of:
    selecting said rectifier element as a multiple arm A-C bridge circuit; and,
    attaining said asymmetric breakdown voltage characteristic by making some of the semiconductor elements in each arm of said bridge circuit uncontrolled diodes connected in series.

7. A method as in claim 1, further comprising the step of:
    providing overvoltage suppressors which protect said rectifier element in the blocking direction against sporadically occurring, surge-like overvoltages.

* * * * *